US012312994B2

(12) United States Patent
Weniger et al.

(10) Patent No.: US 12,312,994 B2
(45) Date of Patent: May 27, 2025

(54) CONTROL DEVICE OF AN EXHAUST GAS GUIDE SECTION OF AN EXHAUST GAS TURBOCHARGER

(71) Applicants: IHI Corporation, Tokyo (JP); Mercedes-Benz Group AG, Stuttgart (DE)

(72) Inventors: Stephan Weniger, Wertach (DE); Viktor Dick, Plankstadt (DE); Zdenek Reif, Edingen-Neckarhausen (DE); Manfred Guthörle, Neckarbischofsheim (DE); Nils Brinkert, Ludwigsburg (DE); Jürgen Weeber, Neckarsulm (DE); Christoph Natkaniec, Ludwigsburg (DE)

( * ) Notice: Subject to any disclaimer, the term of this patent is extended or adjusted under 35 U.S.C. 154(b) by 0 days.

(21) Appl. No.: 18/723,225

(22) PCT Filed: Jan. 31, 2023

(86) PCT No.: PCT/DE2023/100074
§ 371 (c)(1),
(2) Date: Jun. 21, 2024

(87) PCT Pub. No.: WO2023/151749
PCT Pub. Date: Aug. 17, 2023

(65) Prior Publication Data

US 2025/0059906 A1 Feb. 20, 2025

(30) Foreign Application Priority Data

Feb. 9, 2022 (DE) .................... 10 2022 103 039.3

(51) Int. Cl.
*F02B 37/02* (2006.01)
*F02B 37/18* (2006.01)

(52) U.S. Cl.
CPC .......... *F02B 37/025* (2013.01); *F02B 37/183* (2013.01)

(58) Field of Classification Search
CPC ............................ F02B 37/025; F02B 37/183
See application file for complete search history.

(56) References Cited

U.S. PATENT DOCUMENTS

2020/0141309 A1* 5/2020 Reif ..................... F16K 11/085
2021/0033022 A1* 2/2021 Ebert ..................... F02B 37/18

FOREIGN PATENT DOCUMENTS

DE 102015011256 A1 3/2016
DE 202018101705 U 4/2018
(Continued)

*Primary Examiner* — Ngoc T Nguyen
(74) *Attorney, Agent, or Firm* — SOEI PATENT & LAW FIRM

(57) ABSTRACT

A control device for an exhaust gas turbocharger includes a closing device with a closing element and an element lever, pivoting around an axis. The closing element is designed to open and close a first flow cross-section formed by a partition wall between two spiral channels in the exhaust gas-conducting section. Additionally, there is a second flow cross-section associated with a bypass duct designed to direct flow around a turbine wheel. The closing element comprises two parts: one for the first flow cross-section and another for the second flow cross-section. The element lever features an arm that fits into a cavity in the closing element. This cavity has an inner surface, and the arm's outer surface matches the cavity's shape but with differing dimensions. The arm's peripheral surface includes multiple distinct sections, enhancing the engagement with the closing element's cavity.

9 Claims, 5 Drawing Sheets

(56) References Cited

FOREIGN PATENT DOCUMENTS

| | | | |
|---|---|---|---|
| DE | 202018104140 | U | 7/2018 |
| DE | 102017202132 | A1 | 8/2018 |
| DE | 102020123177 | A1 | 3/2022 |
| DE | 102020123179 | A1 | 3/2022 |
| DE | 102021117020 | A1 | 1/2023 |
| WO | 2022048706 | A1 | 3/2022 |
| WO | 2023274446 | A1 | 1/2023 |

* cited by examiner

CONTROL DEVICE OF AN EXHAUST GAS GUIDE SECTION OF AN EXHAUST GAS TURBOCHARGER

CROSS-REFERENCE TO RELATED APPLICATION

This application is a national stage application, filed under 35 U.S.C. § 371, of International Patent Application PCT/DE2023/100074, filed on Jan. 31, 2023, which claims the benefit of German Patent Application DE 10 2022 103 039.3, filed on Feb. 9, 2022.

TECHNICAL FIELD

The disclosure relates to a control device of an exhaust gas-conducting section of an exhaust gas turbocharger.

BACKGROUND

Exhaust gas-conducting sections for exhaust gas turbochargers are known, having a control device for controlling a fluid, in general exhaust gas, which flows through the exhaust gas-conducting section. The control device is provided for opening and closing a bypass duct in the exhaust gas-conducting section, through which a fluid can flow, in order to bypass a turbine wheel of the exhaust gas-conducting section arranged rotatably in the exhaust gas-conducting section in a wheel chamber of the exhaust gas-conducting section. Furthermore, by means of the control device a through-flow opening formed between two spiral channels of the exhaust gas-conducting section can be opened or closed so that the exhaust gas can overflow from one spiral channel into the other and vice versa.

With the aid of such a control device it is possible to completely or partially bypass the turbine wheel at specific operating points of the exhaust gas turbocharger, in particular at operating points which have large flow quantities, thus permitting efficient operation of the exhaust gas turbocharger. The efficient operation of the exhaust gas turbocharger is dependent on a specific opening characteristic of the control device which is to be adapted to meet the requirements of a drive assembly connected to the exhaust gas turbocharger, in particular of an internal combustion engine.

The control device comprises a plurality of components which are connected to each other, wherein relative movements of individual components with respect to each other are also possible. Thus, with respect to a lever arm of the control device, which is designed for movement of the closing element and which receives the closing element at one end, a closing element of the control device, which is provided to close the bypass duct and/or the through-flow opening, comprises a possible movability relative to the lever arm. This possible movability is necessary in order that, e.g. during pivoting of the lever arm with the closing element, it is possible to avoid seizing up in the exhaust gas-conducting section. The relative movability of the two components with respect to each other causes wear on the control device during operation of the exhaust gas turbocharger, which it is necessary at least to reduce.

For instance a control device of an exhaust gas turbocharger can be found in laid-open document DE 10 2017 202 132 A1 and comprises a closing element which is received on a lever arm of the control device. The lever arm protrudes into a cavity of the closing element. In order to reduce wear, one end of the lever arm, which protrudes into the cavity, is designed in portions so as to bring about contact with the closing element. For this purpose, the end of the lever arm comprises guide elements with guide surfaces which can come into contact with the closing element.

Laid-open document DE 10 2015 011 256 A1 likewise discloses a control device of an exhaust gas turbocharger which comprises a closing element and a lever arm which protrudes into the closing element, wherein the end of the lever arm comprises a conical guide element and a cylindrical guide element which are designed to produce a slidable contact.

SUMMARY

The present disclosure provides an improved control device of an exhaust gas-conducting section of an exhaust gas turbocharger.

The control device of an exhaust gas-conducting section of an exhaust gas turbocharger comprises a closing device comprising a closing element and an element lever, wherein the closing device can pivot about an axis of rotation. The closing element is designed to open and close a first flow cross-section of the exhaust gas-conducting section, wherein the first flow cross-section is formed in a partition wall lying between a first spiral channel of the exhaust gas-conducting section and a second spiral channel of the exhaust gas-conducting section. The exhaust gas-conducting section comprises a second flow cross-section which is allocated to a bypass duct which is formed in the exhaust gas-conducting section and which is designed to bypass a flow against a turbine wheel formed in the exhaust gas-conducting section. The closing element comprises a first element portion for closing the first flow cross-section and a second element portion which can be used to close the second flow cross-section. The element lever is designed comprising an arm portion engaging into a cavity in the closing element. The cavity comprises an inner surface and the arm portion comprises an outer surface located opposite the inner surface. An inner peripheral surface of the inner surface and a peripheral surface of the outer surface are identical in form with different dimensions, wherein the peripheral surface comprises at least two different peripheral portions.

In principle, it is advantageous to effect a relative movement between the closing element and the element lever so that it is possible to prevent the closing element from tilting or seizing up in the exhaust gas-conducting section. The control device is used to substantially reduce wear of the element lever and/or the closing element by reason of the relative movement because contact between the element lever, in particular the arm portion, and the closing element can occur at various points on the arm portion and the closing element. That is to say in other words that, on the one hand, the contact between the arm portion and the closing element which is required for the safe function of the control device is achieved in every position of the control device and this contact can be configured as large as needed. Furthermore, by reason of the contact which is optimized in terms of size and results in contact surfaces optimized in terms of size, noise development is likewise reduced.

In one embodiment of the control device, a movement gap is formed between the inner surface and the outer surface and is formed in dependence upon a position of the control device. This means that the inner surface and the outer surface can be configured in dependence upon operating points of a drive unit connected to the exhaust gas turbocharger.

In a further embodiment, the arm portion is supported axially and/or radially on a cover element of the closing device so that it is securely received in the cavity of the closing element.

The inner peripheral surface and the peripheral surface preferably comprise at least one truncated cone-shaped portion.

In a further advantageous embodiment, the arm portion extends along the longitudinal axis starting from its base surface which is located opposite a cavity base of the closing element, at least to a closing surface of the second element portion so that a preferred sealing tightness can be achieved.

In a particularly advantageous manner, a first transition portion which is formed between the first peripheral portion and the second peripheral portion serves to connect the two peripheral portions together in order to provide a continuous progression of the peripheral surface along the longitudinal axis. Therefore, the arm portion can slide unhindered on the closing element, wherein it is also advantageous that the first transition portion is formed in a curved manner.

If the cavity base comprises a groove at least on its base edge which is adjacent to the first peripheral portion, it is possible to achieve further improved sliding and thus a further reduction in wear.

Alternatively, the arm portion can be secured with the aid of a pin which extends starting from the cavity base along the longitudinal axis.

Overall, it can be said that the control device reduces wear even at high temperatures, that heat transportation from the closing element to the element lever is reduced which results in lower component temperatures. Likewise, simple and cost-effective production is possible, in particular in a casting method, by reason of simple contours of the closing element and the element lever, in particular the mutually contacting surfaces thereof.

The pot-shaped designs of the closing element and the arm portion result in a control device which has a reduced weight.

Further advantages, features and details of the invention will be apparent from the following description of preferred exemplified embodiments and with reference to the drawing. The features and combinations of features mentioned earlier in the description and the features and combinations of features mentioned hereinunder in the description of the figures and/or illustrated in the figures alone can be employed not only in the combination stated in each case but also in other combinations or on their own. Like or functionally identical elements are allocated identical reference signs.

DETAILED DESCRIPTION

Figure 1:
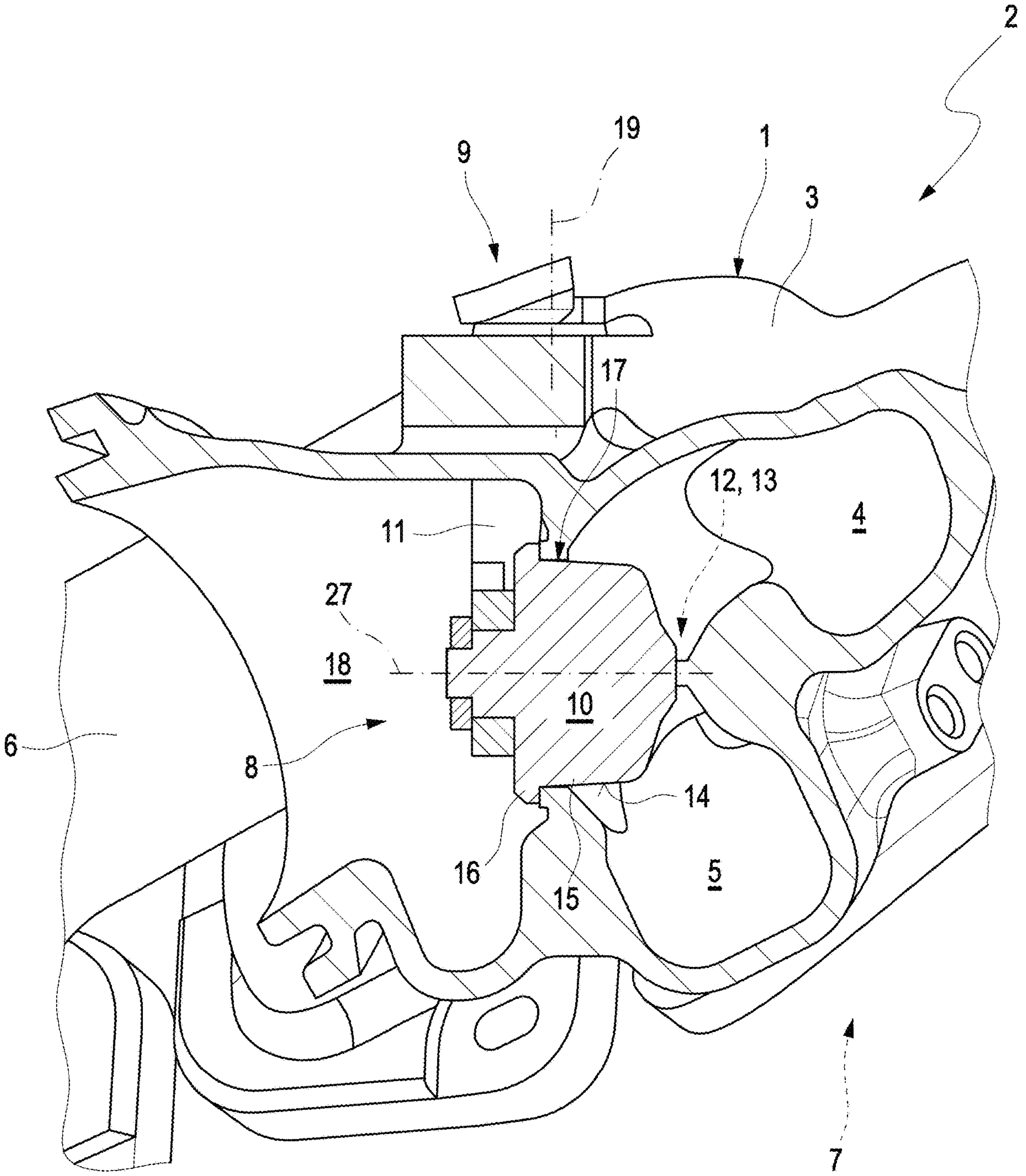
Fig. 1 (Prior Art)
FIG. 1 shows a perspective view of a cross-section along a plane of cut through an exhaust gas-conducting section of an exhaust gas turbocharger with a control device according to the prior art.
Figure 2:
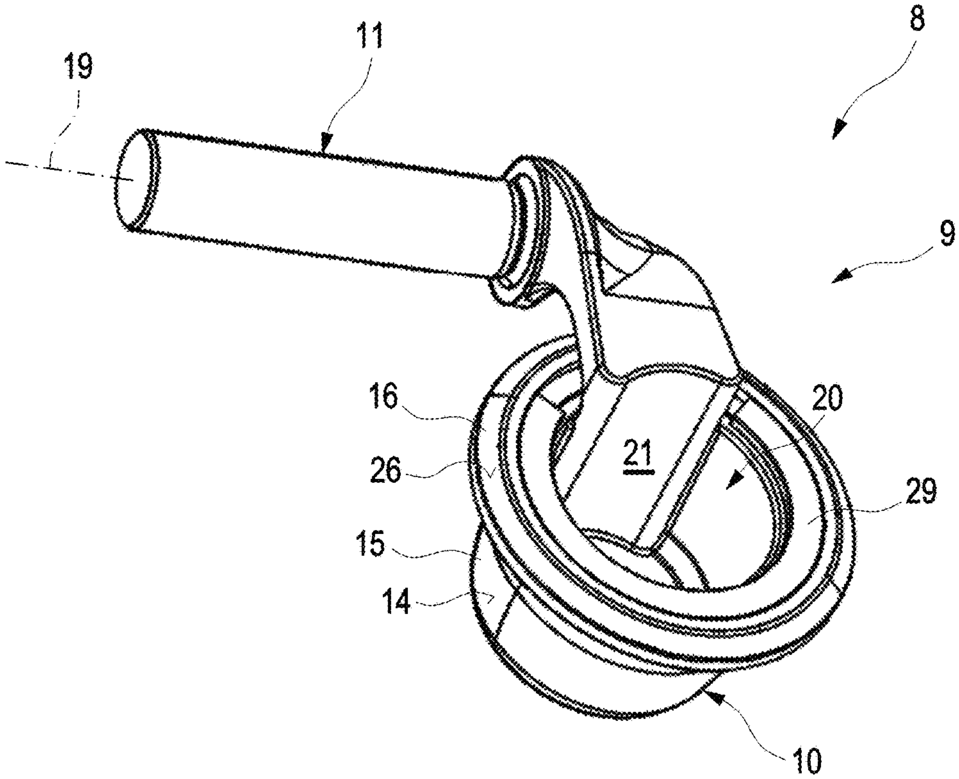
FIG. 2 shows a perspective view of a closing device of a control device of an exhaust gas turbocharger in a first exemplified embodiment.
Figure 3:
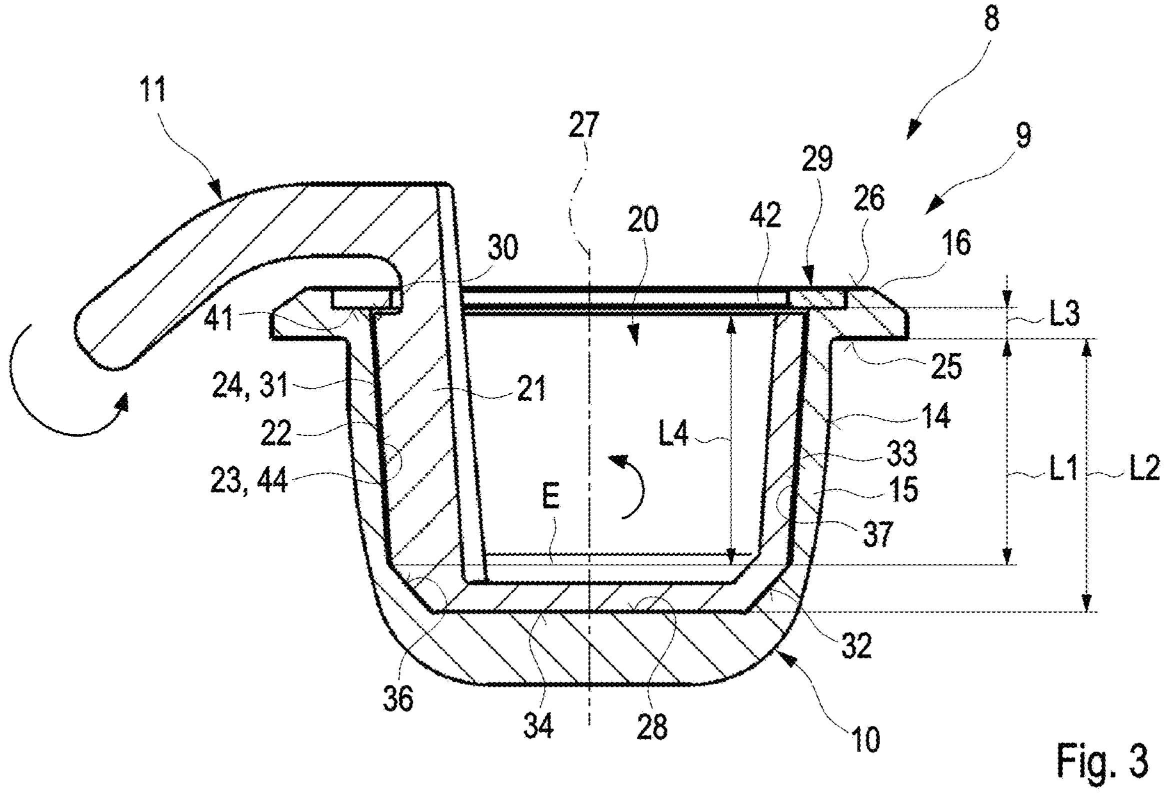
FIG. 3 shows a sectional view of the closing device of FIG. 2.
Figure 4:
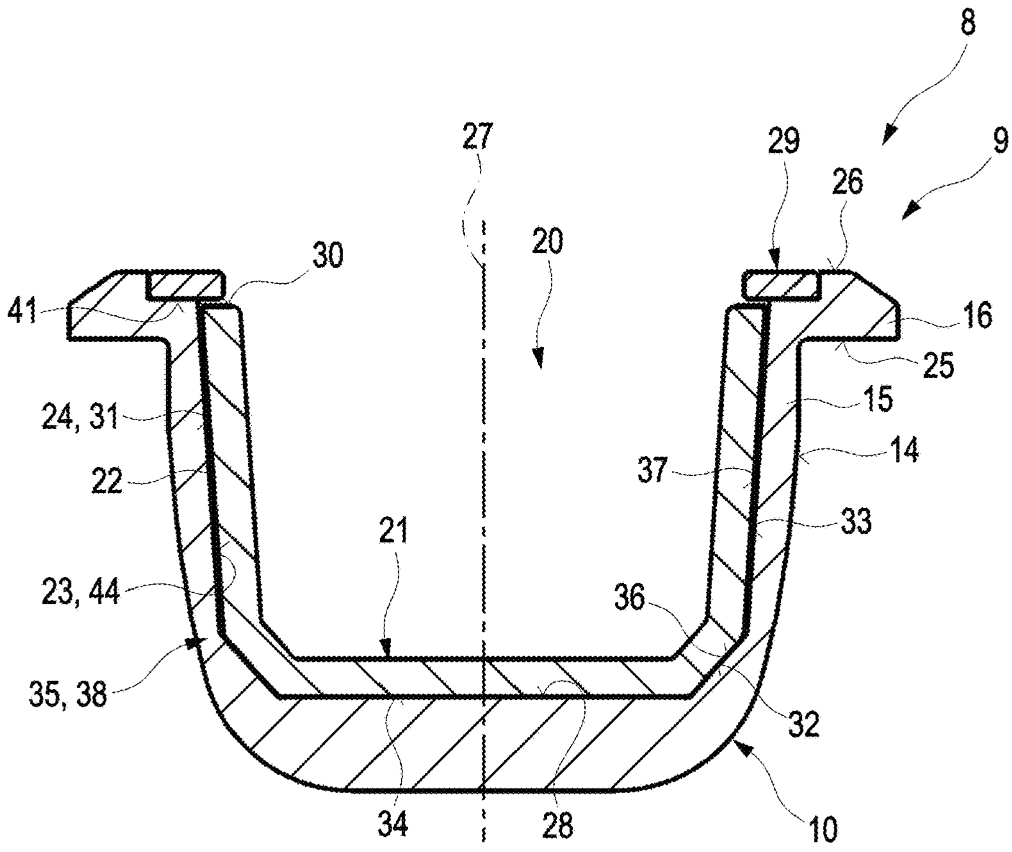
FIG. 4 shows a further sectional view of the closing device of FIG. 2.

An exhaust gas-conducting section 1 of an exhaust gas turbocharger 2, which conducting section is designed according to FIG. 1 and can have a flow pass through it, comprises an inlet channel 3 to allow a fluid flow to enter the exhaust gas-conducting section 1, in general exhaust gas of an internal combustion engine 7, a first spiral channel 4 and a second spiral channel 5 downstream of the inlet channel 3 to condition the flow, and an outlet channel, not illustrated in greater detail, downstream of the spiral channels 4, 5, via which the exhaust gas can escape from the exhaust gas-conducting section 1 in a directed manner. Formed between the spiral channels 4, 5 and the outlet channel is a wheel chamber, not illustrated in greater detail, in which a turbine wheel, not illustrated in greater detail, is rotatably received.

In the present exemplified embodiment, the exhaust gas-conducting section 1 is connected to an exhaust gas manifold 6 of the internal combustion engine 7 so that the exhaust gas from the internal combustion engine 7 can enter into the spiral channels 4, 5 via the inlet channel 3 in order to act upon the turbine wheel.

In order to adapt an operating behaviour of the exhaust gas turbocharger 2 to the fluid flow of the internal combustion engine 7, and therefore to the internal combustion engine 7, a control device 8 for separating and connecting the first spiral channel 4 and the second spiral channel 5 is disposed in the exhaust gas-conducting section 1. The control device 8 comprises a closing device 9 comprising a closing element 10 and an element lever 11, wherein the element lever 11 is designed to pivot the closing element 10 by a pivot angle.

In order to separate and to connect the two spiral channels 4, 5 the closing element 10 is disposed in a through-flow opening 12 which is designed the two spiral channels 4, 5 to each other so that a flow can pass through.

In a first position, the closing position of the closing element 10, as shown in FIG. 1, the two spiral channels 4, 5 can have a flow pass through them in a completely mutually separated manner, wherein the through-flow opening 12 is completely closed by the closing element 10. The exhaust gas of the internal combustion engine 7 flows through the two spiral channels 4, 5, wherein a first part of the exhaust gas flows through the first spiral channel 4 and a second part of the exhaust gas flows through the second spiral channel 5.

In a second position of the closing element 10, which is not shown in more detail, the through-flow opening 12 is completely open and exhaust gas can overflow out of the first spiral channel 4 into the second spiral channel 5, and vice versa. This means that exhaust gas can overflow from one spiral channel 4; 5 into the other spiral channel 5; 4 via the through-flow opening 12 which comprises a first flow cross-section 13.

The closing element 10 is to be positioned between the first position and the second position into further intermediate positions, and so the first flow cross-section 13 can be adapted to a corresponding requirement to achieve the best possible efficiency of the exhaust gas turbocharger 2 according to the through-flowing exhaust gas quantity.

In order to bring about a preferable opening of the first flow cross-section 13, the closing element 10 is designed comprising a pot-shaped outer contour 14.

The closing element 10 comprises a first element portion 15 for closing the first flow cross-section 13 and a second element portion 16 which can be used to close a second flow cross-section 17 formed in the exhaust gas-conducting section 1.

The second flow cross-section 17 is provided to flow around the turbine wheel. In other words, this means that the exhaust gas flowing through the second flow cross-section 17 is fed past the turbine wheel, and the turbine wheel is not acted upon by this exhaust gas flowing through the second flow cross-section 17. The second flow cross-section 17 is formed in a bypass duct 18 which is conventionally designated as a so-called wastegate duct. The closing device 9 can pivot about an axis of rotation 19.

The closing element 10, depicted in FIGS. 2 to 7, of the control device 8 according to a first and a second exemplified embodiment likewise has an approximately pot-shaped outer contour 14, wherein, in a cavity 20 of the closing element 10, an arm portion 21 of the element lever 11 which faces the closing element 10 is arranged in an engaging manner.

The closing device 9 designed according to the first exemplified embodiment comprises the arm portion 21 which is likewise pot-shaped. The arm portion 21 can be inserted into the closing element 10 with a movement gap 22 being formed, wherein the movement gap 22 is formed between an inner surface 23 of the cavity 20 and an outer surface 24 of the arm portion 21.

Portions of the inner surface 23 and the outer surface 24 contact one another in dependence upon a position of the closing device 9. That is to say in other words that, in one position of the closing device 9, part of the outer surface 24 contacts part of the inner surface 23, and therefore the movement gap 22 moves towards zero between these parts and is of a corresponding size between the remaining parts of the inner surface 23 and the outer surface 24. Which parts of the inner surface 23 now contact which parts of the outer surface 24 and what size they and the movement gap 22 are is different from position to position of the closing device 9. Therefore, the movement gap 22 between the inner surface 23 and the outer surface 24 is formed in dependence upon a position of the control device 8.

This also means that the inner surface 23 is approximately, but not completely, complementary to the outer surface 24. In other words, the inner surface 23 and the outer surface 24 are identical in form with different dimensions.

The closing element 10 comprises its second element portion 16 which, in order to effect closing of the second flow cross-section 17, has a closing surface 25 which faces away from a cover surface 26 of the second element portion 16.

The arm portion 21 which is pot-shaped extends starting from a cavity base 28 of the closing element 10 along a longitudinal axis 27 of the closing element 10 at least to the closing surface 25. In an advantageous manner, it extends over the closing surface 25.

In order to axially secure the arm portion 21 in the cavity 20, a cover element 29, which is annular in this exemplified embodiment, is formed which—fastened on the inner surface 23 to the closing element—is supported thereon and at least partially encompasses or, in other words, covers a portion surface 30 of the arm portion 21 in a radial direction.

In this first exemplified embodiment, a peripheral surface 31 of the outer surface 24 comprises two different peripheral portions, a first peripheral portion 32 and a second peripheral portion 33. The two peripheral portions 32, 33 are formed according to peripheral surfaces or truncated cones, their cover surfaces, i.e. the surfaces having a smaller diameter, are arranged facing the cavity base 28. This results in a widening of the peripheral surface 31 from the cavity base 28. A base surface 34 of the outer surface 24 which is arranged opposite the cavity base 28 is planar according to the first exemplified embodiment. Therefore, an inner peripheral surface 44 of the inner surface 23 and the peripheral surface 31 of the outer surface 24 are identical in form with different dimensions, wherein the peripheral surface 31 comprises at least two different portions, the first peripheral portion 32 and the second peripheral portion 33.

Figure 5:
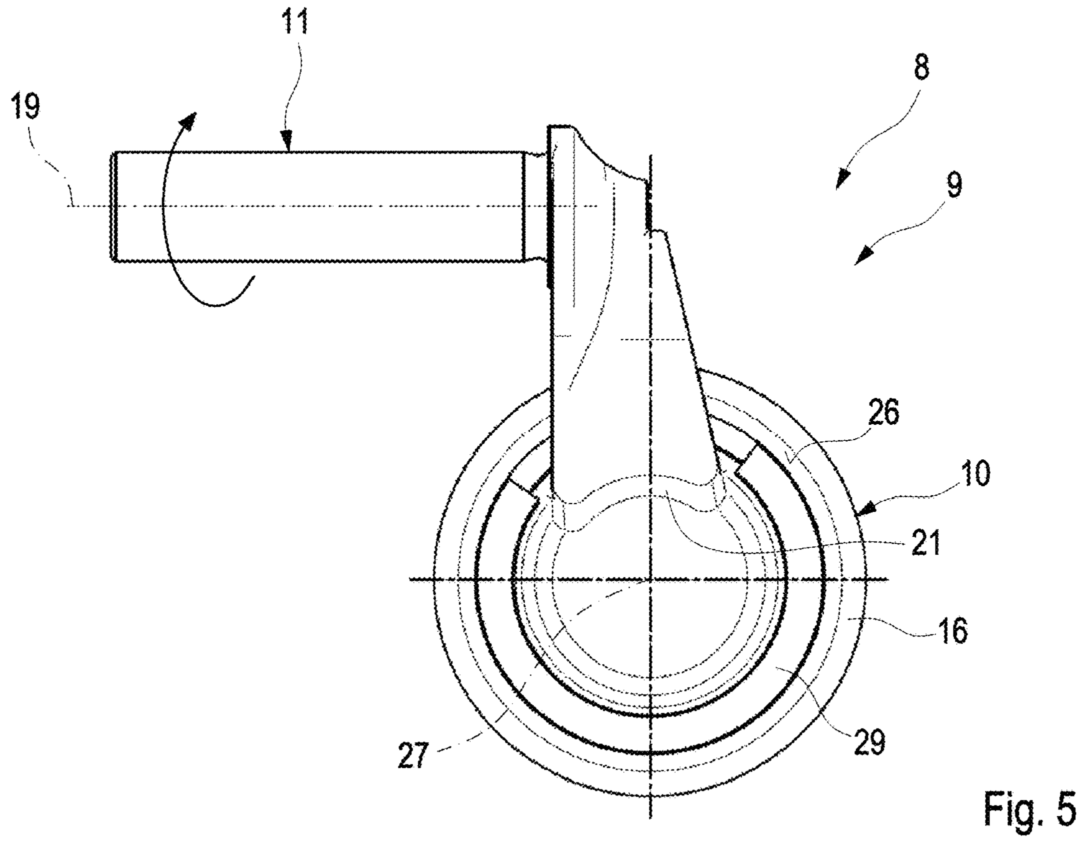
FIG. 5 shows a plan view of the closing device of FIG. 2.

FIG. 5 shows a plan view of the closing device 9 according to the first exemplified embodiment. When the element lever 11 is rotated in the direction of the arrow, the movement gap 22 between the cavity base 28 and the base surface 34 is increased in size until at most the portion surface 30 abuts against the cover element 29, whereby the arm portion 21 is supported axially and radially on the cover element 29, wherein, by reason of an asymmetrical application of force on the arm portion 21, the arm portion performs, in the cavity 20, a tilting movement in the direction of the movement arrow indicated in FIG. 3.

The tilting movement which can also be referred to as a coordinated tilting movement because it is limited by reason of the corresponding configuration of at least the inner surface 23 and the outer surface 24 and preferably the base surface 34 and/or the cavity base 28. That is to say in other words that a relative movement can be effected between the arm portion 21 and the closing element 10 which produces low levels of wear and noise.

The maximum tilting of the closing element 10 relative to the arm portion 21 should preferably not exceed 1.35°. In order to ensure that this maximum tilting can be maintained, additionally for axially securing the arm portion 21 with the aid of the cover element 29, a first angle α is formed between the peripheral portions 32, 33 and, in relation to a virtual plane E which forms a parallel line with respect to the base surface 34, preferably has a value in a value range between 91° and 120° and preferably 95°.

Starting from the virtual plane E, the arm portion 21 extends along the longitudinal axis 27 at least over a first length L1 which corresponds to an axial distance between the closing surface 25 and the virtual plane E. Starting from the base surface 34, the arm portion 21 extends along the longitudinal axis 27 to the closing surface 25 over a second length L2 and so an axial extension of the first peripheral portion 32 corresponds to a difference between the second length L2 and the first length L1.

The cover element 29 is arranged, starting from the closing surface 25 with its lower surface 41, which is opposite the portion surface 30, at an axial distance with a third length L3, wherein a further movement gap 42 is formed between the cover element 29 and the arm portion 21, in particular its portion surface 30, in particular if the base surface 34 contacts the cavity base 28, wherein, however, a fourth length L4, over which the arm portion 21 extends starting from the virtual plane E along the longitudinal axis 27, is greater than the first length L1 and less than a sum of the first length L1 and the third length L3.

Preferably, the second length L2 is greater than the first length L1 which, in a preferred exemplified embodiment, is 80% of the second length L2.

The first peripheral portion 32 is inclined with respect to the base surface 34 at a second angle β which basically has a value which is greater than the value of the first angle α, and is preferably in a value range between 120° and 150°, more preferably has a value of 135°.

Formed between the first peripheral portion 32 and the second peripheral portion 33 is a first transition portion 35 which connects the two peripheral portions 32, 33 together such that a continuous progression of the peripheral surface 31 along the longitudinal axis 27 is achieved. The first transition portion 35 is formed in a curved manner.

Likewise, a second transition portion 38 is formed between a first inner surface portion 36 of the inner peripheral surface 44, which is opposite the first peripheral portion 32, and a second inner surface portion 37 of the inner peripheral surface 44, which is opposite the second peripheral portion 33, and which is designed in a manner adapted to the first transition section 35 according to the identical form and the different dimensions of the inner surface 23 and the outer surface 24.

In order to achieve a further free movement capability of the closing element 10, the cavity base 28 comprises, at least on its base edge 39 which is adjacent to the first peripheral portion 32, a groove 40 which, in the present exemplified embodiment, is in the form of an annular groove.

Figure 6:
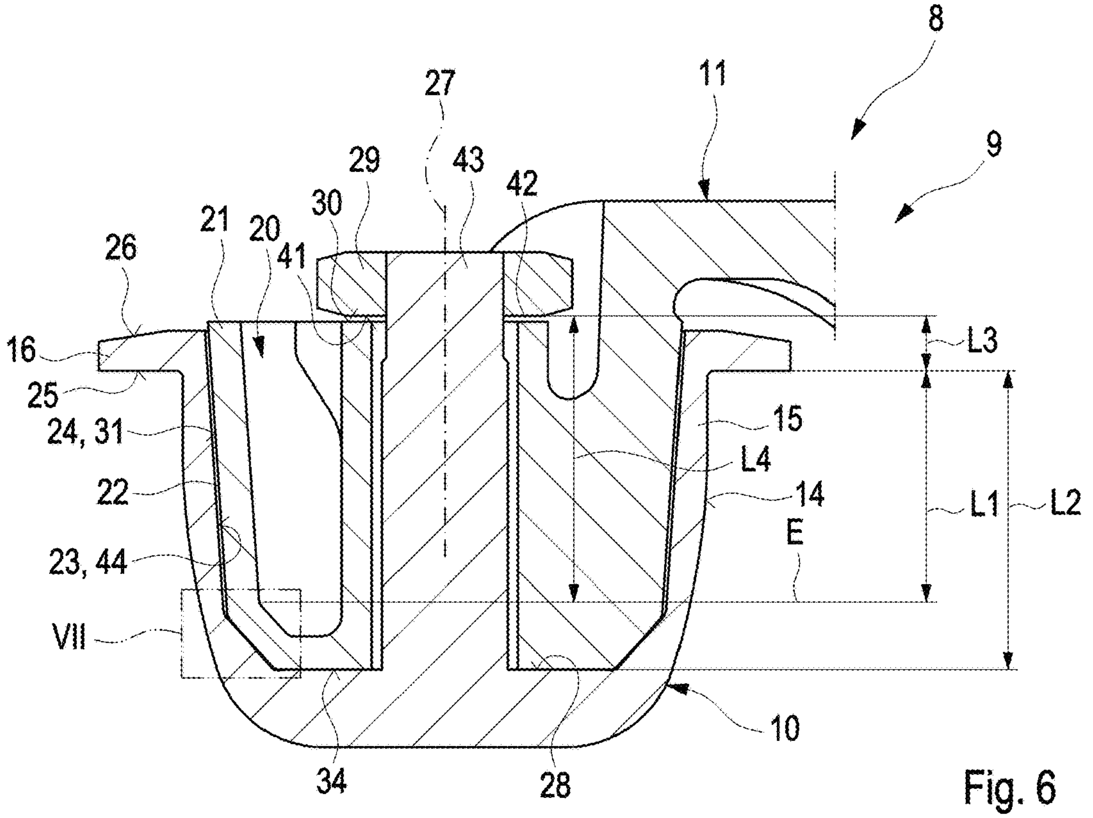
FIG. 6 shows a sectional view of the closing device of the control device, in a second exemplified embodiment.
Figure 7:
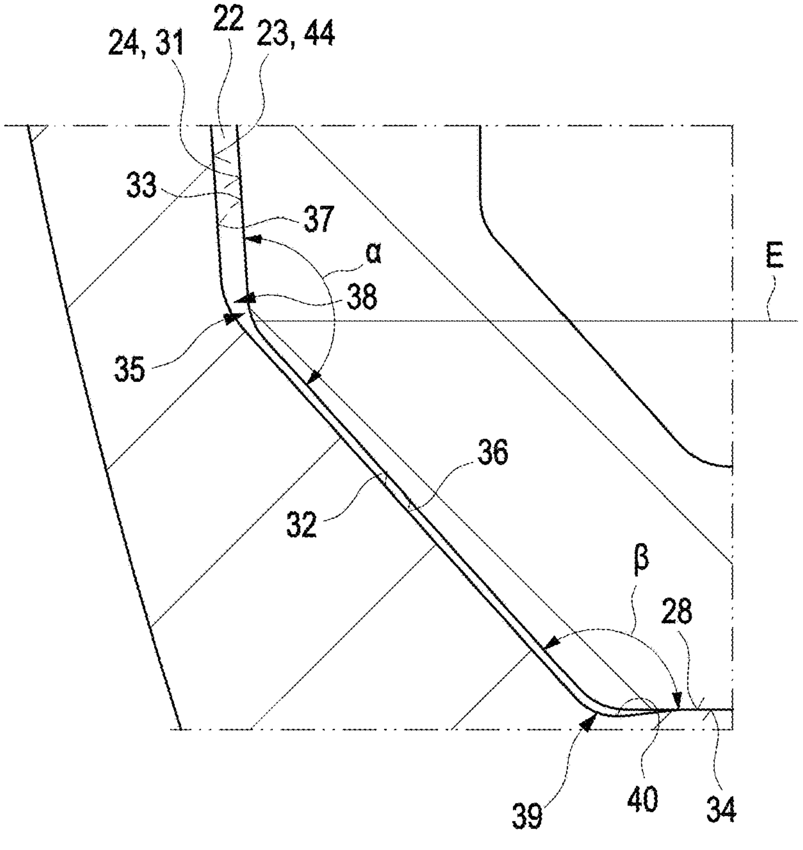
FIG. 7 shows a detailed view VII of the closing device of FIG. 6.
Figure 8:
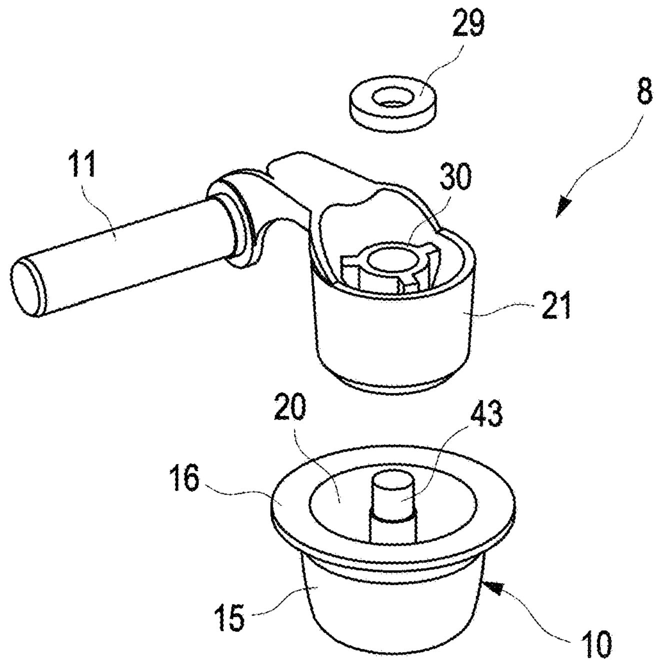
FIG. 8 shows an exploded view of the control device according to the second exemplified embodiment.

FIGS. 6 to 8 show the control device 8 according to the second exemplified embodiment. The arm portion 21 is secured with the aid of a pin 43 which extends starting from the cavity base 28 of the closing element 10 along the longitudinal axis 27. FIG. 7 shows a detailed view VII of the closing device 9 of the control device 8 in the region of the transition portions 35, 38. Of course, the virtual plane E is arranged in an axial direction along the longitudinal axis 27 in a manner intersecting the first transition portion 35.

It should be mentioned that the term peripheral surface 31 is to be understood to mean at least the peripheral surface of the arm portion 21 which extends in an axial direction along the longitudinal axis 27 starting from the base surface 34 over the second length L2. This likewise applies to the inner peripheral surface 44. That is to say in other words that the peripheral surfaces 31, 44 can contact one another at least in an axial direction over the second length L2 at any point.

Figure 9:
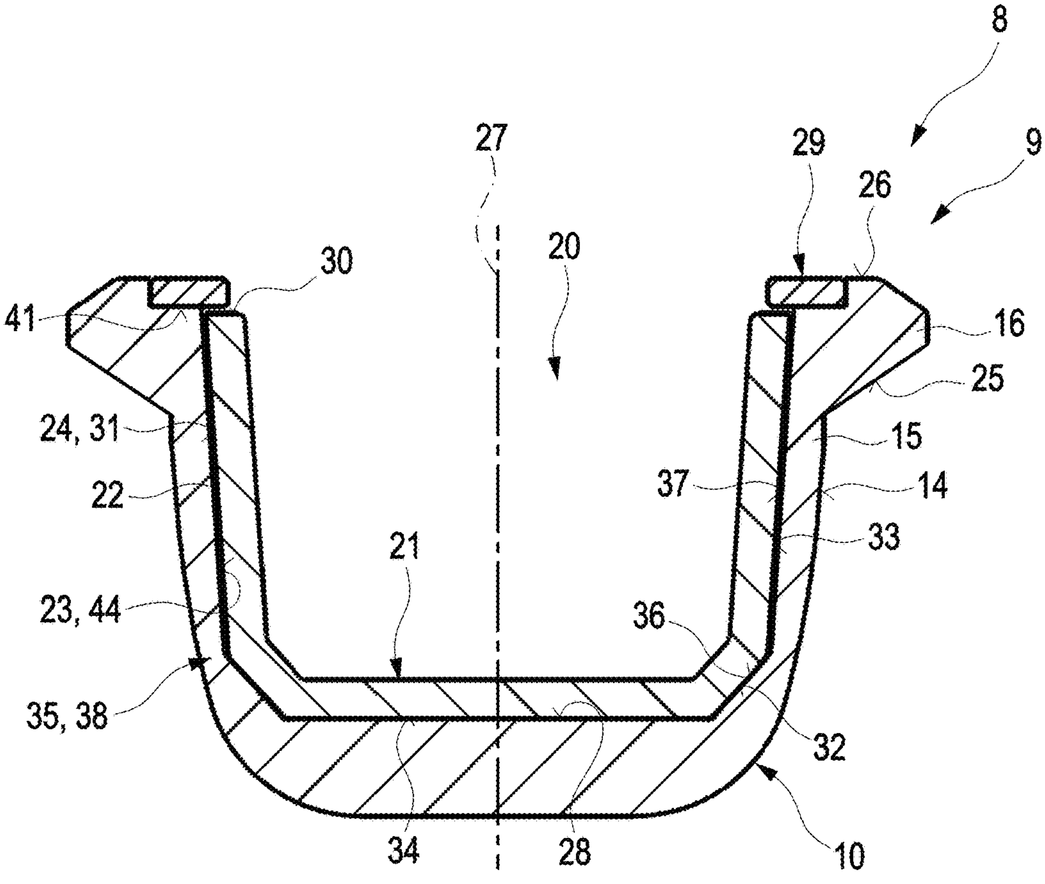
FIG. 9 shows the control device in a third exemplified embodiment.

In a third exemplified embodiment of the control device 8, the closing surface 25 is inclined in relation to the longitudinal axis 27, as illustrated in FIG. 9. In order to achieve a lightweight design, the second element portion 16 can also be hollow or at least partially hollow.

The control device 8 now comprises a rotationally symmetrical surface which is formed between the closing element 10 and the arm portion 21 and effects axial force application, concentric positioning and a radial stop of the closing element 10. The tendency for the closing element 10 and the arm portion 21 to wear, which occurs as a consequence of pressure pulsations during the operation of the exhaust gas turbocharger 2, can be eliminated by, simply put, a conical guide. An axial contact surface formed between the cavity base 28 and the base surface 34 is also provided in order to bring about damage-free force application. An outer radial part of a total contact surface between the closing element 10 and the arm portion 21 is decisive in order to bring about a reduced movement capability initiated by pressure pulsations during operation. This minimises the force pulsation in the overall kinematics of the control device 8.

LIST OF REFERENCE SIGNS

1 Exhaust gas-conducting section
2 Exhaust gas turbocharger
3 Inlet channel
4 First spiral channel
5 Second spiral channel
6 Exhaust gas manifold
7 Internal combustion engine
8 Control device
9 Closing device
10 Closing element
11 Element lever
12 Through-flow opening
13 First flow cross-section
14 Outer contour
15 First element portion
16 Second element portion
17 Second flow cross-section
18 Bypass duct
19 Axis of rotation
20 Cavity
21 Arm portion
22 Movement gap
23 Inner surface
24 Outer surface
25 Closing surface
26 Cover surface
27 Longitudinal axis
28 Cavity base
29 Cover element
30 Portion surface
31 Peripheral surface
32 First peripheral portion
33 Second peripheral portion
34 Base surface
35 First transition portion
36 First inner surface portion
37 Second inner surface portion
38 Second transition portion
39 Base edge
40 Groove
41 Lower surface
42 Further movement gap
43 Pin
44 Inner peripheral surface
E Virtual plane
L1 First length
L2 Second length
L3 Third length
L4 Fourth length
α First angle
β Second angle

The invention claimed is:

1. A control device (8) of an exhaust gas-conducting section (1) of
an exhaust gas turbocharger (2), comprising:
a closing device (9) comprising
a closing element (10) and
an element lever (11),
wherein the closing device (9) can pivot about an axis of rotation (19), and
wherein the closing element (10) is designed to open and close a first flow cross-section (13) of the exhaust gas-conducting section (1), and
wherein the first flow cross-section (13) is formed in a partition wall lying between a first spiral channel (4) of the exhaust gas-conducting section (1) and a second spiral channel (5) of the exhaust gas-conducting section (1), and wherein the exhaust gas-conducting section (1) comprises a second flow cross-section (17) which is allocated to a bypass duct (18) formed in the exhaust gas-conducting section (1), and wherein the bypass duct is designed to bypass a flow against a turbine wheel formed in the exhaust gas-conducting section (1), and wherein the closing element (10) comprises a first element portion (15) for closing the first flow cross-section (13) and a second element portion (16) which can be used to close the second flow cross-section (17), and wherein the element lever (11) comprises an arm portion (21) engaging into a cavity (20) of the closing element (10), and wherein the arm portion (21) is pot-shaped, and wherein the cavity (20) comprises an inner surface (23) and the arm portion (21) comprises an outer surface (24) opposite the inner surface (23), and wherein an inner peripheral surface (44) of the inner surface (23) and a peripheral surface (31) of the outer surface (24) are identical in form with different dimensions, and wherein the peripheral surface (31) comprises at least two different peripheral portions (32, 33), and wherein a cavity base (28) of the closing element (10) comprises a groove (40) at least on its base edge (39) which is adjacent to a first peripheral portion (32) of the at least two different peripheral portions (32, 33).

2. The control device (8) as claimed in claim 1, wherein a movement gap (22) is formed between the inner surface (23) and the outer surface (24) and is formed in dependence upon a position of the control device (8).

3. The control device (8) as claimed in claim 1, wherein the arm portion (21) is supported axially and/or radially on a cover element (29) of the closing device (9).

4. The control device (8) as claimed in claim 1, wherein the inner peripheral surface (44) and the peripheral surface (31) comprise at least one truncated cone-shaped portion.

5. The control device (8) as claimed in claim 1, wherein the arm portion (21) extends along a longitudinal axis (27) starting from its base surface (34) which is opposite the cavity base (28) of the closing element (10), at least to a closing surface (25) of the second element portion (16).

6. The control device (8) as claimed in claim 1, wherein a first transition portion (35) which is formed between the first peripheral portion (32) and a second peripheral portion (33) of the at least two different peripheral portions (32, 33) serves to connect the at least two different peripheral portions (32, 33) together in order to provide a continuous progression of the peripheral surface (31) along a longitudinal axis (27).

7. The control device (8) as claimed in claim 6, wherein the first transition portion (35) is formed in a curved manner.

8. The control device (8) as claimed in claim 1, wherein the arm portion (21) is secured with by a pin (43) which extends starting from the cavity base (28) along a longitudinal axis (27).

9. An exhaust gas turbocharger (2), comprising:

an exhaust gas-conducting section (1), including a first flow cross-section (13) formed in a partition wall lying between a first spiral channel (4) and a second spiral channel (5), and a second flow cross-section (17) which is allocated to a bypass duct (18) formed in the exhaust gas-conducting section (1), the bypass duct being designed to bypass a flow against a turbine wheel formed in the exhaust gas-conducting section (1); and a closing device (9) comprising a closing element (10) and an element lever (11), wherein the closing device (9) can pivot about an axis of rotation (19), and wherein the closing element (10) is designed to open and close the first flow cross-section (13) of the exhaust gas-conducting section (1), and wherein the closing element (10) comprises a first element portion (15) for closing the first flow cross-section (13) and a second element portion (16) which can be used to close the second flow cross-section (17), and wherein the element lever (11) comprises a pot-shaped arm portion (21) engaging into a cavity (20) of the closing element (10), and wherein the cavity (20) comprises an inner surface (23) and the pot-shaped arm portion (21) comprises an outer surface (24) opposite the inner surface (23), and wherein an inner peripheral surface (44) of the inner surface (23) and a peripheral surface (31) of the outer surface (24) are identical in form with different dimensions, and wherein the peripheral surface (31) comprises at least two different peripheral portions (32, 33), and wherein a cavity base (28) of the closing element (10) comprises a groove (40) at least on its base edge (39) which is adjacent to a first peripheral portion (32) of the at least two different peripheral portions (32, 33).

* * * * *